US012664382B1

(12) United States Patent
Bellows et al.

(10) Patent No.: US 12,664,382 B1
(45) Date of Patent: Jun. 23, 2026

(54) RFID ANTENNA ASSEMBLY FOR A HAND-HELD DEVICE FOR READING RFID TAGS AND METHOD OF ASSEMBLING THE SAME

(71) Applicant: Zebra Technologies Corporation, Lincolnshire, IL (US)

(72) Inventors: David Bellows, Fort Salonga, NY (US); Mithun Mahadevaiah, Farmingdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/312,862

(22) Filed: Aug. 28, 2025

(51) Int. Cl.
G06K 7/10 (2006.01)
H01Q 1/22 (2006.01)
(52) U.S. Cl.
CPC ..... G06K 7/10316 (2013.01); G06K 7/10386 (2013.01); H01Q 1/2216 (2013.01)
(58) Field of Classification Search
CPC ........... G06K 7/10316; G06K 7/10386; H01Q 1/2216

USPC ......................................................... 235/451
See application file for complete search history.

(56) References Cited

U.S. PATENT DOCUMENTS

| | | | |
|---|---|---|---|
| 12,451,604 B2 * | 10/2025 | Chen ...................... | H01Q 21/26 |
| 12,531,333 B1 * | 1/2026 | Wolf ...................... | H01Q 1/523 |
| 2011/0012788 A1 * | 1/2011 | Rowell ............... | H01Q 9/0428 |
| | | | 343/700 MS |
| 2024/0173578 A1 * | 5/2024 | Thompson ............. | H01Q 21/28 |
| 2025/0271110 A1 * | 8/2025 | Bocock .............. | H10H 29/8508 |

* cited by examiner

*Primary Examiner* — Daniel A Hess

(57) ABSTRACT

An example radio-frequency identification (RFID) antenna assembly includes a first printed circuit board (PCB), a second PCB, spaced apart from and generally parallel to the first PCB, a spacer, and a cable coupled to the first PCB and extending through a passage in the spacer and an opening in the second PCB. The first PCB and the second PCB are configured to operate as an RFID antenna. The first PCB is positioned proximate a first side of the spacer and is secured to the spacer, and the second PCB is positioned proximate a second side of the spacer, opposite the first side, and is secured to the spacer. A radiation pattern produced by the RFID antenna assembly is substantially directed away from a first side of the first PCB, opposite the spacer.

24 Claims, 11 Drawing Sheets

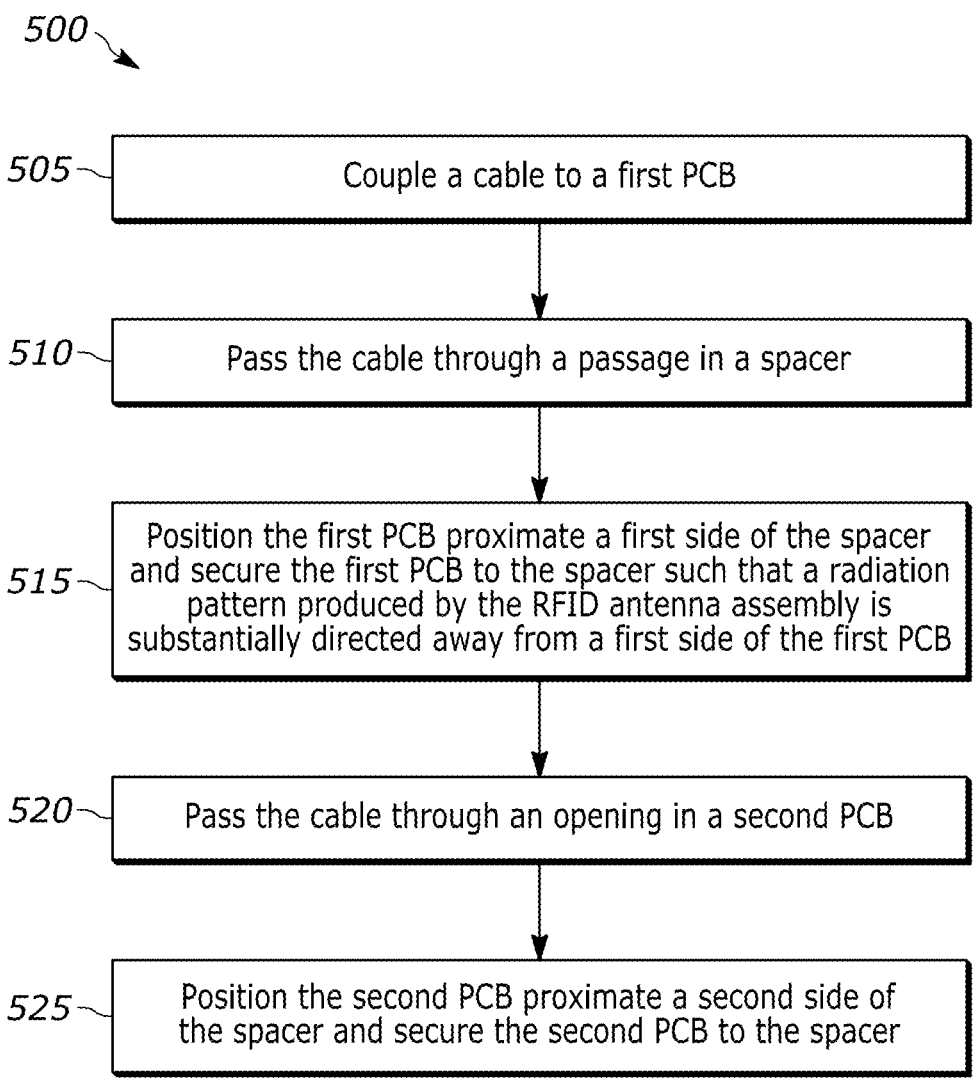

500

505 — Couple a cable to a first PCB

510 — Pass the cable through a passage in a spacer

515 — Position the first PCB proximate a first side of the spacer and secure the first PCB to the spacer such that a radiation pattern produced by the RFID antenna assembly is substantially directed away from a first side of the first PCB 520 — Pass the cable through an opening in a second PCB 525 — Position the second PCB proximate a second side of the spacer and secure the second PCB to the spacer

FIG. 11

RFID ANTENNA ASSEMBLY FOR A HAND-HELD DEVICE FOR READING RFID TAGS AND METHOD OF ASSEMBLING THE SAME

BACKGROUND

Conventional RFID antenna assemblies are often integrated into hand-held devices by dividing the antenna assembly across separate structural components of the device housing. However, this approach can complicate manufacturing and logistics processes, as it may require the antenna vendor to source large housing components, assemble antenna parts directly to those housings, and ship partially integrated assemblies for final device construction. These logistical hurdles can create extended lead times and increase the resources required for the production of RFID-enabled devices.

Splitting antenna components across multiple housing portions can also introduce significant challenges in ensuring precise alignment and minimizing tolerance stackup. For example, the spacing between antenna elements, which may be constructed using printed circuit boards, directly impacts antenna performance and is affected by the cumulative variability of multiple tolerance factors associated with different housing features, assembly processes, and material configurations. Such designs can lead to variability in critical dimensions and may not allow for the validation of RF performance until late in the assembly process. This increases the likelihood of inconsistent performance and makes early quality control measures more difficult to implement.

Additionally, cable routing in such designs often faces complexity due to physical constraints and multi-housing dependencies. The routing may require the cables to span gaps between separate housings, navigate sharp edges or narrow channels, and integrate into devices with minimal slack or excess length. This routing approach can be cumbersome, lead to damaged cables during manufacturing or device use, and complicate assembly steps. In addition, there can also be mechanical durability issues in such designs, particularly in areas where fragile components and/or features are positioned at high-stress points or are directly in the load path during drop events or rough handling.

SUMMARY

In an embodiment, the present invention is a radio-frequency identification (RFID) antenna assembly, comprising a first printed circuit board (PCB), a second PCB, a spacer, and a cable coupled to the first PCB and extending through a passage in the spacer and an opening in the second PCB. The second PCB is spaced apart from and generally parallel to the first PCB and the first PCB and the second PCB are configured to operate as an RFID antenna. The first PCB is positioned proximate a first side of the spacer and is secured to the spacer and the second PCB is positioned proximate a second side of the spacer, opposite the first side, and is secured to the spacer. A radiation pattern produced by the RFID antenna assembly is substantially directed away from a first side of the first PCB, opposite the spacer.

In a variation of this embodiment, the spacer is electrically non-conductive.

In another variation of this embodiment, the cable is a radio-frequency (RF) coaxial cable that is mechanically and electrically coupled to the first PCB.

In another variation of this embodiment, the spacer includes a main body, a first plurality of posts extending from the main body on the first side of the spacer, and a second plurality of posts extending from the main body on the second side of the spacer. The first PCB is mounted on the first plurality of posts such that the first PCB is spaced apart from the main body of the spacer and the second PCB is mounted on the second plurality of posts such that the second PCB is spaced apart from the main body of the spacer.

In another variation of this embodiment, the first plurality of posts are positioned outside of a footprint of a first antenna trace on the first PCB and the second plurality of posts are positioned outside of a footprint of a second antenna trace on the second PCB.

In another variation of this embodiment, the first PCB is secured to the first plurality of posts via heat staking and the second PCB is secured to the second plurality of posts via heat staking.

In another variation of this embodiment, a first end of the spacer extends outside of a first perimeter of the first PCB and outside of a second perimeter of the second PCB, and a second end of the spacer, opposite the first end, extends outside of the first perimeter of the first PCB and outside of the second perimeter of the second PCB.

In another variation of this embodiment, a first pad is located at the first end of the spacer and a second pad is located at the second end of the spacer.

In another variation of this embodiment, a main body of the spacer is webbed.

In another embodiment, the present invention is a hand-held device for reading RFID tags, comprising a housing including a top portion, a front portion, and a handle. A main printed circuit board (PCB) is positioned in the top portion of the housing and an RFID antenna assembly is positioned in the front portion of the housing and operatively connected to the main PCB. The RFID antenna assembly includes a first PCB, a second PCB, a spacer, and a cable coupled to the first PCB and extending through a passage in the spacer and an opening in the second PCB, the cable operatively connecting the first PCB and the main PCB. The second PCB is spaced apart from and generally parallel to the first PCB, and the first PCB and the second PCB are configured to operate as an RFID antenna. The first PCB is positioned proximate a first side of the spacer and is secured to the spacer, and the second PCB is positioned proximate a second side of the spacer, opposite the first side, and is secured to the spacer. A radiation pattern produced by the RFID antenna assembly is substantially directed away from a first side of the first PCB, opposite the spacer.

In a variation of this embodiment, the spacer is electrically non-conductive.

In another variation of this embodiment, the cable is a radio-frequency (RF) coaxial cable that is mechanically and electrically coupled to the first PCB.

In another variation of this embodiment, the spacer of the RFID antenna assembly includes a main body, a first plurality of posts extending from the main body on the first side of the spacer, and a second plurality of posts extending from the main body on the second side of the spacer. The first PCB is mounted on the first plurality of posts such that the first PCB is spaced apart from the main body of the spacer and the second PCB is mounted on the second plurality of posts such that the second PCB is spaced apart from the main body of the spacer.

In another variation of this embodiment, the first plurality of posts are positioned outside of a footprint of a first antenna trace on the first PCB and the second plurality of posts are positioned outside of a footprint of a second antenna trace on the second PCB.

In another variation of this embodiment, the first PCB is secured to the first plurality of posts via heat staking, and the second PCB is secured to the second plurality of posts via heat staking.

In another variation of this embodiment, a first end of the spacer extends outside of a first perimeter of the first PCB and outside of a second perimeter of the second PCB and is held between a front half of the front portion of the housing and a rear half of the front portion of the housing. A second end of the spacer, opposite the first end, extends outside of the first perimeter of the first PCB and outside of the second perimeter of the second PCB and is held between the front half of the front portion of the housing and the rear half of the front portion of the housing.

In another variation of this embodiment, the hand-held device includes a first pad located at the first end of the spacer and positioned between the first end of the spacer and the front half of the front portion of the housing and a second pad located at the second end of the spacer and positioned between the second end of the spacer and the front half of the front portion of the housing.

In another embodiment, the present invention is a method of assembling an RFID antenna assembly, comprising: coupling a cable to a first printed circuit board (PCB); passing the cable through a passage in a spacer; positioning the first PCB proximate a first side of the spacer and securing the first PCB to the spacer such that a radiation pattern produced by the RFID antenna assembly is substantially directed away from a first side of the first PCB, opposite the spacer; passing the cable through an opening formed in a second PCB, the first PCB and the second PCB configured to operate as an RFID antenna; and positioning the second PCB proximate a second side of the spacer, opposite the first side, and securing the second PCB to the spacer.

In a variation of this embodiment, the spacer is electrically non-conductive.

In another variation of this embodiment, the cable is a radio-frequency (RF) coaxial cable and coupling the cable to the first PCB includes mechanically and electrically coupling the cable to the first PCB.

In another variation of this embodiment, the spacer includes a main body, a first plurality of posts extending from the main body on the first side of the spacer, and a second plurality of posts extending from the main body on the second side of the spacer. Positioning the first PCB proximate the first side of the spacer includes mounting the first PCB on the first plurality of posts such that the first PCB is spaced apart from the main body of the spacer, and positioning the second PCB proximate the second side of the spacer includes mounting the second PCB on the second plurality of posts such that the second PCB is spaced apart from the main body of the spacer.

In another variation of this embodiment, the first plurality of posts are positioned outside of a footprint of a first antenna trace on the first PCB and the second plurality of posts are positioned outside of a footprint of a second antenna trace on the second PCB.

In another variation of this embodiment, securing the first PCB to the spacer includes heat staking the first PCB to the first plurality of posts and securing the second PCB to the spacer includes heat staking the second PCB to the second plurality of posts.

In another variation of this embodiment, a first end of the spacer extends outside of a first perimeter of the first PCB and outside of a second perimeter of the second PCB and includes a first pad, and a second end of the spacer, opposite the first end, extends outside of the first perimeter of the first PCB and outside of the second perimeter of the second PCB and includes a second pad.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 11 illustrates a flowchart for an example method of assembling an RFID antenna assembly.

Figure 1:
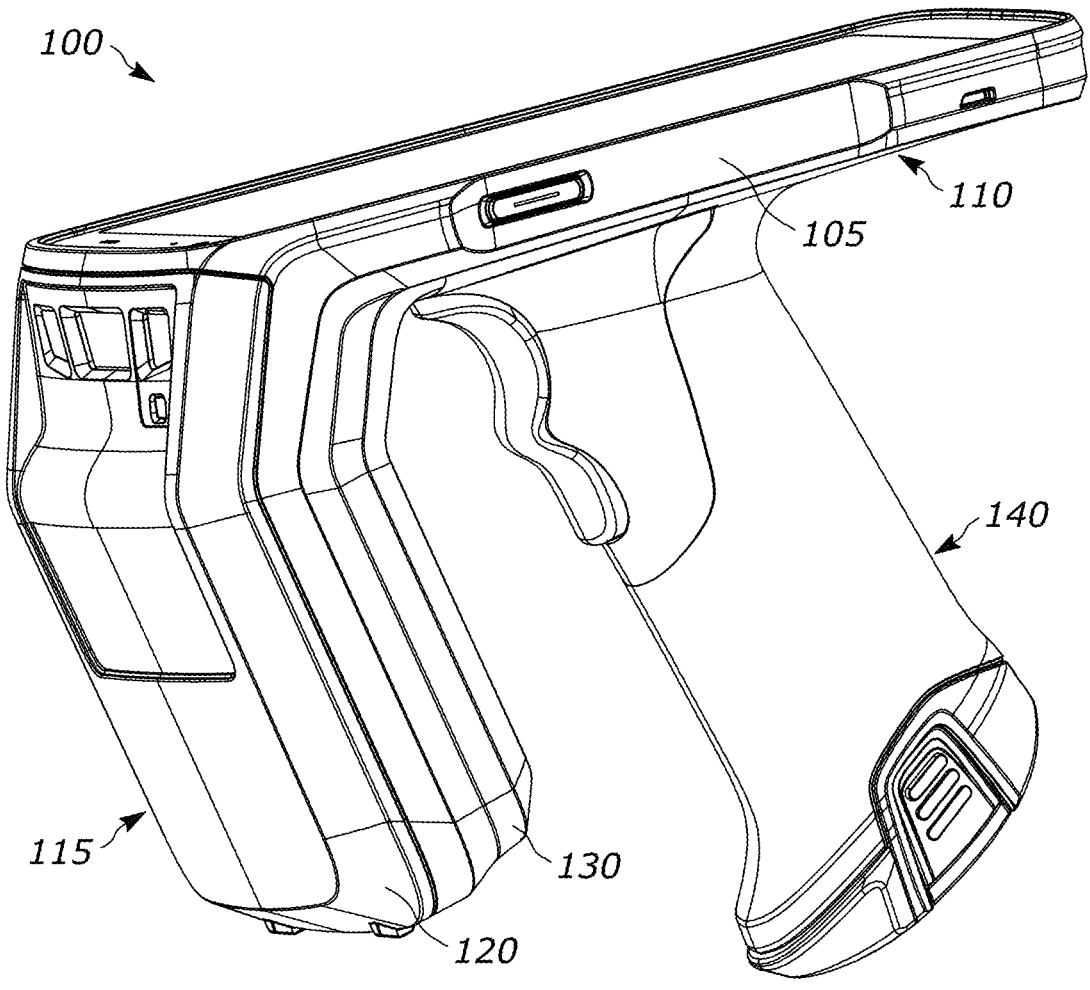
FIG. 1 illustrates a perspective view of an example hand-held device.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example radio-frequency identification (RFID) antenna assemblies/hand-held devices/methods herein include RFID antenna assemblies that can be constructed to enhance RFID tag reading and enable streamlined integration into the hand-held devices. The RFID antenna assemblies are assembled as a modular unit, with two printed circuit boards (PCBs) comprising the antenna's RF structure secured on opposite sides of a spacer and operating collectively as an antenna. The mounting of the PCBs on opposite sides of the spacer provides a consistent distance between the PCBs, which can improve the consistency and performance of the radiation pattern generated by the RFID antenna assembly by reducing tolerance variability. This consistent distance between the PCBs can also improve the consistency of the RFID antenna's resonant frequency, bandwidth, and impedance. Additionally, the pre-assembly of the RFID antenna assembly before installation into the hand-held device can simplify routing of the cable that is coupled to one of the PCBs and passes through an opening in the other PCB by reducing system complexity and mitigating manufacturing risks.

In addition, the spacer of the RFID antenna assembly may extend beyond the boundaries of the PCB perimeters and can be held between front and rear portions of the front portion of the housing of the hand-held device, without fixing or fastening the RFID antenna assembly to the housing, creating a mechanical buffer that isolates the RFID antenna assembly, particularly the two PCBs, from external forces and drop impacts. Rubber pads or other cushioning mechanisms may also be included to further stabilize the assembly and enhance its durability.

The example RFID antenna assemblies can provide more consistent performance by enabling consistent RFID tag readings from one RFID antenna assembly to the next and reduce potential performance issues caused by improper antenna alignment or inconsistent board-to-board spacing. In addition, the spacer reduces or eliminates issues of tolerance stackup that can complicate the assembly of hand-held devices with RFID antennas, optimizing the RF performance of the RFID antenna.

The assembly of the RFID antenna assembly prior to installation in the hand-held device can also address logistical and cost issues. For example, manufacturers no longer need specialized assembly equipment on the final assembly line nor face challenges with tolerance variability arising from separate antenna and housing features, which can improve manufacturing yields and reduce lead time and production costs while allowing for simpler supply chain operations.

The example RFID antenna assemblies also allow for reuse and scalability of the RFID antenna assembly in multiple device designs without sacrificing performance. By providing a functional RFID antenna assembly module that is independent of the housing it is mounted into, the RFID antenna assemblies can be incorporated into future designs and/or retrofit into older devices for higher performance seamlessly with either no or minimal integration efforts. This adaptability allows the RFID antenna assemblies to serve as a reusable building block for next-generation products, ensuring design cohesion and continued performance improvements.

The example RFID antenna assemblies also allow for modular testing of RF performance before integration into a fully assembled hand-held device. Manufacturers can pre-validate and adjust antenna parameters to ensure optimal performance before the RFID antenna is assembled into the hand-held device. This reduces post-assembly troubleshooting and further enhances production efficiency while safeguarding device functionality across diverse use cases.

Figure 2:
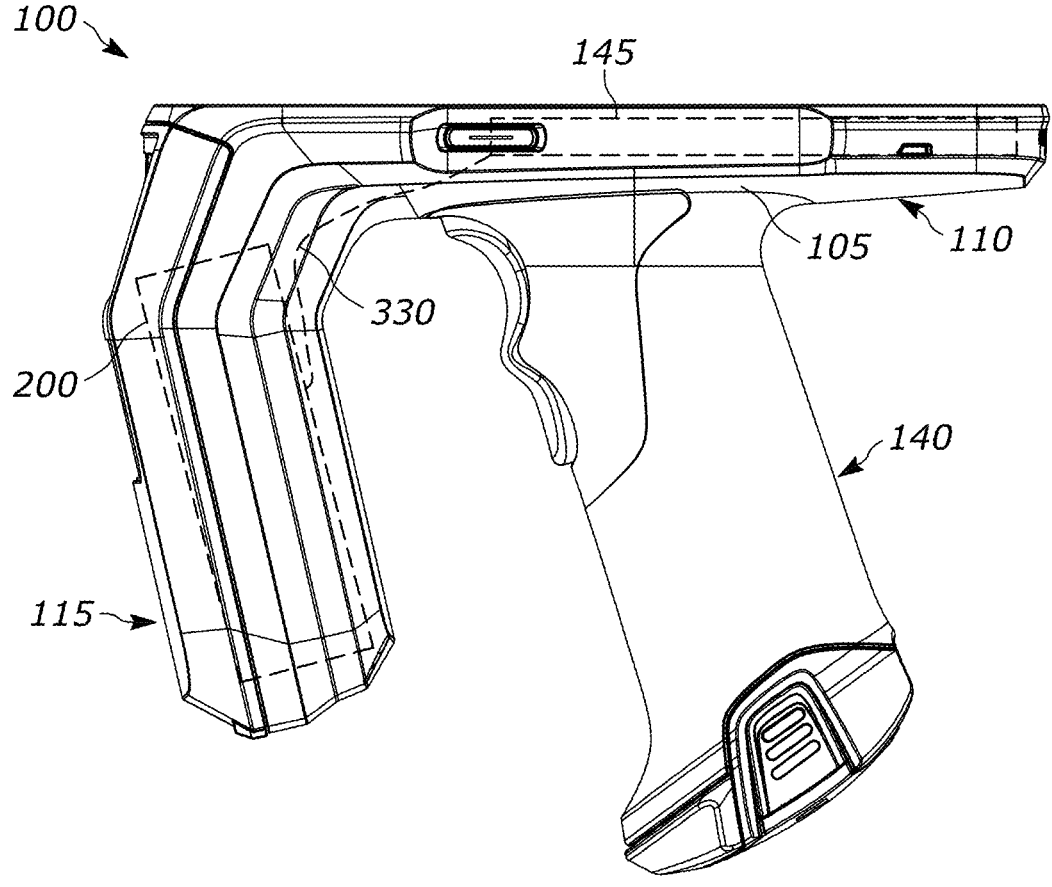
FIG. 2 illustrates a side view of the hand-held device of FIG. 1.
Figure 3:
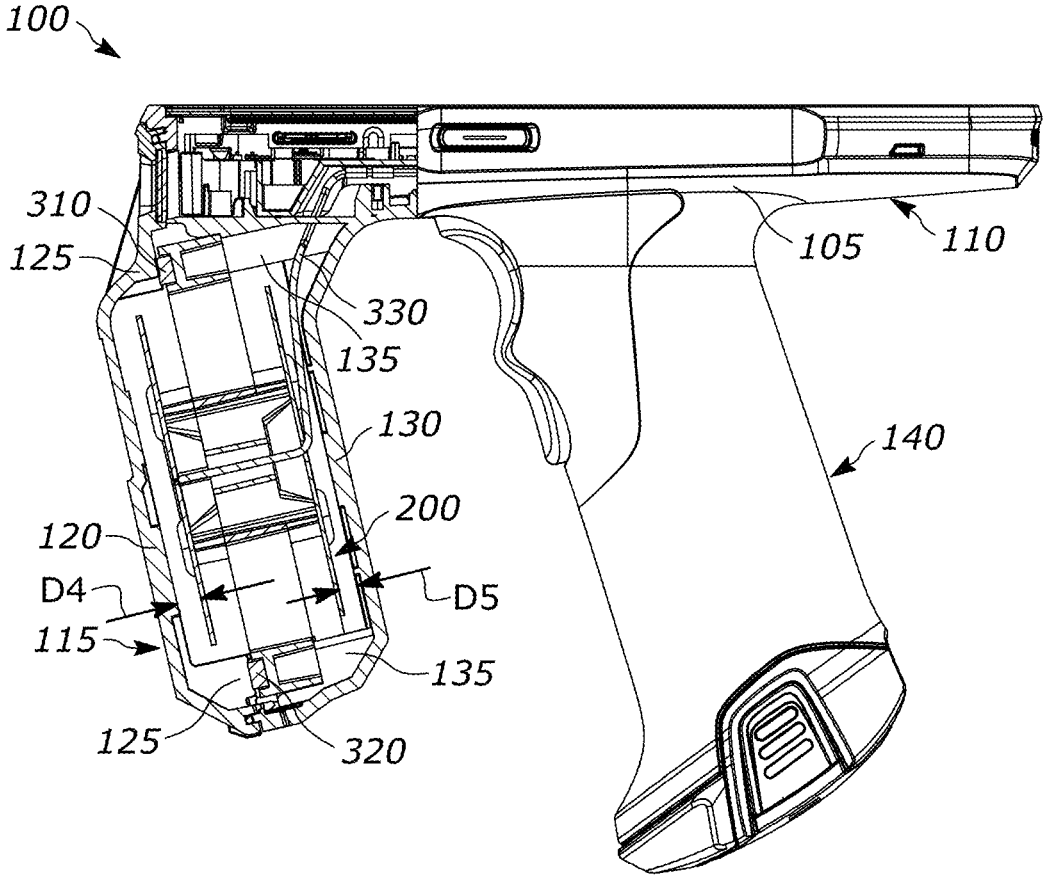
FIG. 3 illustrates a partial cross-sectional side view of the hand-held device of FIG. 1.

Referring to FIGS. 1-3, an example hand-held device 100 for reading radio-frequency identification (RFID) tags includes a housing 105 that defines a top portion 110, a front portion 115, and a handle 140 extending from top portion 110. Housing 105 can be made from injection molded polycarbonate, for example. As shown in FIG. 2, a main PCB 145 is positioned in top portion 110 of housing 105 and an RFID antenna assembly 200 is positioned in front portion 115 of housing 105, also referred to as a radome, and is operatively connected to main PCB 145. As can be seen in FIG. 3, in the example shown, RFID antenna assembly 200 is nested in front portion 115 of housing 105 and is not fixed or fastened to front portion 115 of housing 105. Rather, RFID antenna assembly 200 is held between ribs 125 in a front half 120 of front portion 115 of housing 105 and ribs 135 in a rear half 130 of front portion 115 of housing 105. In the examples illustrated in FIGS. 1-3, front half 120 of front portion 115 of housing 105 is a physically separate component and is fastened to rear half 130 of front portion 115 of housing 105 to thereby create front portion 115 of housing 105. It should also be noted that while FIGS. 1-3 illustrate an integrated RFID reader as the hand-held device 100, the invention described herein can also incorporate RFID antenna assembly 200 in an RFID accessory, such as an RFID sled, as the hand-held device 100. In other implementations, RFID antenna assembly 200 can be similarly incorporated in a fixed RFID reader.

Figure 4:
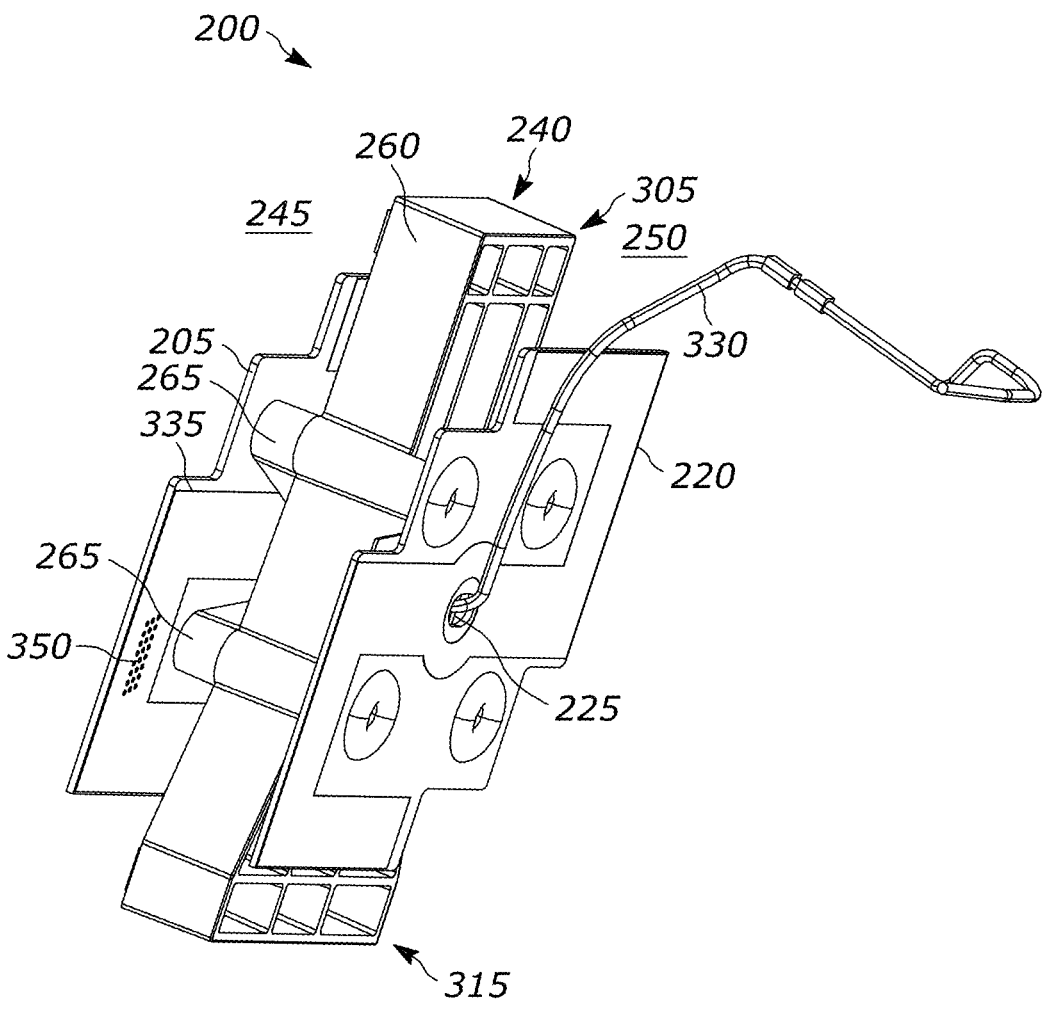
FIG. 4 illustrates a perspective view of an example RFID antenna assembly of the hand-held device of FIG. 1.
Figure 5:
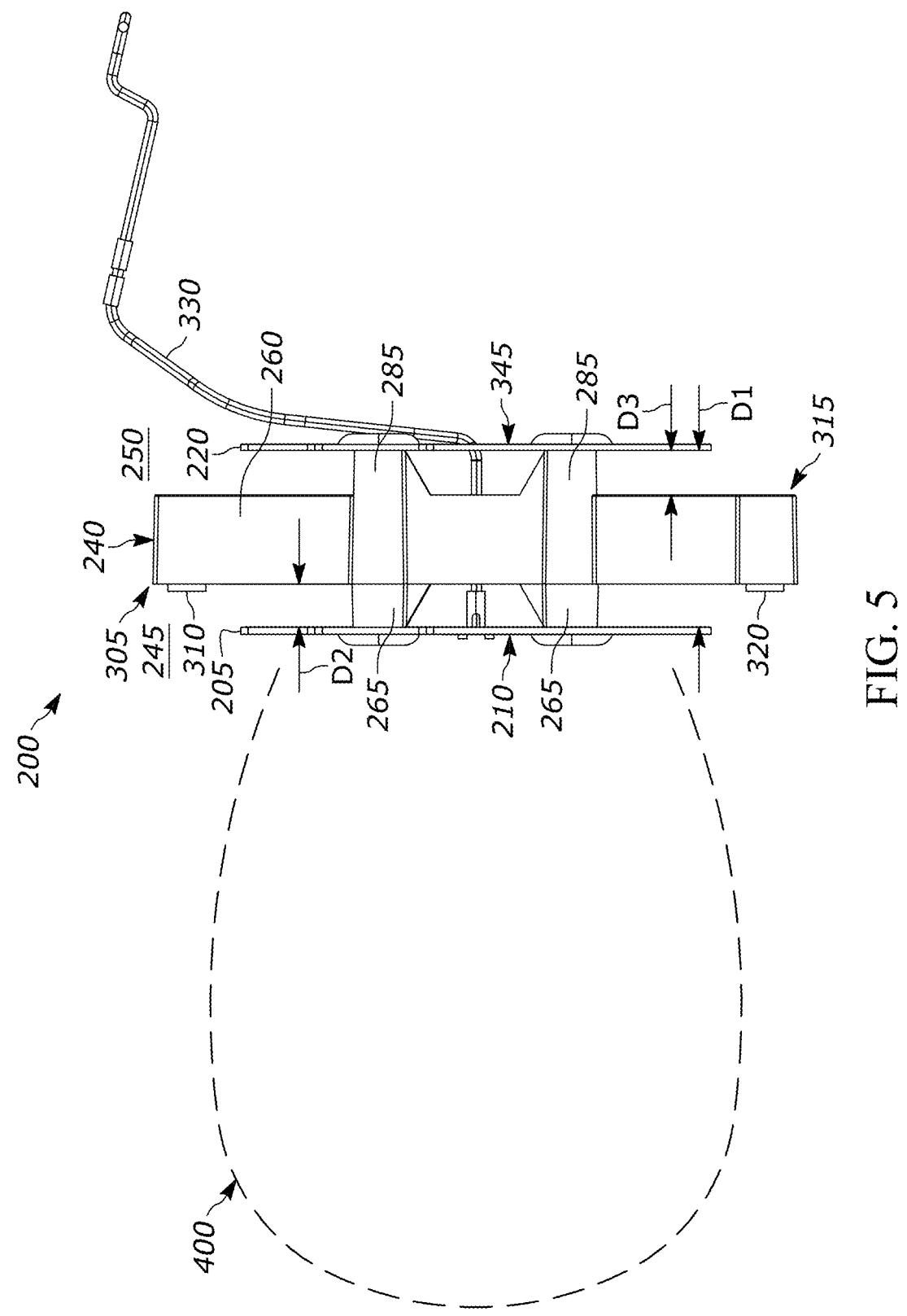
FIG. 5 illustrates a side view of the RFID antenna assembly of FIG. 4.

Referring to FIGS. 4-7, example RFID antenna assembly 200 generally includes a first PCB 205, a second PCB 220, a spacer 240, and a cable 330 that operatively connects first PCB 205 to main PCB 145. First PCB 205 is positioned proximate a first side 245 of spacer 240, and second PCB 220 is positioned proximate a second side 250 of spacer 240, opposite first side 245. First PCB 205 and second PCB 220 are each secured to spacer 240, for example, via heat staking, plastic screws, adhesive, sonic welding, plastic bolts and nuts, plastic standoffs, plastic clips, or any other suitable non-conductive fasteners or suitable non-conductive securing method, as discussed in more detail below. With first PCB 205 and second PCB 220 secured to spacer 240, second PCB 220 is spaced apart from and is generally parallel to first PCB 205 such that first PCB 205 and second PCB 220 are configured to operate as an RFID antenna with a radiation pattern 400 produced by RFID antenna assembly 200 substantially directed away from a first side 210 of first PCB 205, opposite spacer 240 (FIG. 5). Securing first PCB 205 and second PCB 220 to spacer 240 allows the distance D1 (FIG. 5) between first PCB 205 and second PCB 220 to be controlled, since first PCB 205 and second PCB 220 are assembled to opposite sides of spacer 240, and provides X-Y, or lateral, alignment as well as relative angular alignment of first PCB 205 and second PCB 220. In addition, at least one post of first plurality of posts 265 and at least one post of second plurality of posts 285 can be offset such that each of first plurality of posts 265 and second plurality of posts 285 are arranged in an asymmetric pattern, with the asymmetric pattern of first plurality of posts 265 being different than the asymmetric pattern of second plurality of posts 285. These asymmetric patterns can be repeated in the corresponding mating holes in first PCB 205 and second PCB 220 that accept first plurality of posts 265 and second plurality of posts 285, respectively. Thus, this arrangement can prevent improper assembly of first PCB 205 and second PCB 220 on spacer 240, such as misaligning the angular orientation of first PCB 205 and/or second PCB 220 on spacer 240 and/or flipping first PCB 205 and/or second PCB 220 over such that first side 210 of first PCB 205 incorrectly faces spacer 240 and/or first side 345 of second PCB 220 incorrectly faces spacer 240. Cable 330 is coupled to first PCB 205 and extends through a passage 255 in spacer 240 (see FIGS. 8, 9) and through an opening 225 in second PCB 220. In the example shown, cable 330 is an RF coaxial cable that is mechanically and electrically coupled (e.g., via soldering) to a central location on first PCB 205. This central location on first PCB 205 can generally align with passage 255 in spacer 240, which in turn can generally align with opening 225 in second PCB 220, thereby enabling cable 330 to pass through to the other side of RFID antenna assembly 200 in a controlled fashion. Alternatively, the mechanical and electrical coupling of cable 330 to first PCB 205 can be achieved via a mating connector pair, with one half of the connector pair soldered to first PCB 205 and the other half of the connector pair soldered or crimped to the end of cable 330. Cable 330 can also be grounded at the quarter-wave point (i.e., at a distance from first PCB 205 and second PCB 220 equal to the one-quarter wavelength that corresponds to the usable resonating frequency of RFID antenna assembly 200). The distal end of cable 330, opposite the connection to first PCB 205, may be operatively connected to main PCB 145 via soldering or a mating connector pair.

First PCB 205 is mounted on first plurality of posts 265 of spacer 240 and secured to first plurality of posts 265 such that first PCB 205 is spaced apart from main body 260 of spacer 240. Similarly, second PCB 220 is mounted on second plurality of posts 285 of spacer 240 such that second PCB 220 is spaced apart from main body 260 of spacer 240. In the example shown, first PCB 205 is spaced apart from main body 260 by a distance D2 (FIG. 5) of approximately 6.0 mm, and second PCB 220 is spaced apart from main body 260 by a distance D3 (FIG. 5) of approximately 6.0 mm. In other implementations, distance D2 and distance D3 could be smaller or larger depending on the particular implementation. First PCB 205 can be secured to first plurality of posts 265 and second PCB 220 can be secured to second plurality of posts 285 via heat staking or via other non-metallic means, such as plastic threaded members, adhesive, sonic welding, plastic bolts and nuts, plastic standoffs, plastic clips, other suitable non-conductive fasteners, etc. Heat staking first PCB 205 and second PCB 220 to spacer 240 does not require any additional hardware or other secondary parts, which can result in a lower cost to manufacture RFID antenna assembly 200. In addition, by assembling first PCB 205 onto first plurality of posts 265 and second PCB 220 onto second plurality of posts 285 prior to securing first PCB 205 and second PCB 220 to their respective posts, first PCB 205 and second PCB 220 can be pre-aligned in the X and Y, or lateral, axes, as well as be pre-aligned to each other angularly. This can allow for a tighter tolerance control of the finished assembly dimensions and therefore a more consistent RFID antenna assembly 200 with a more repeatable RF performance.

Figure 8:
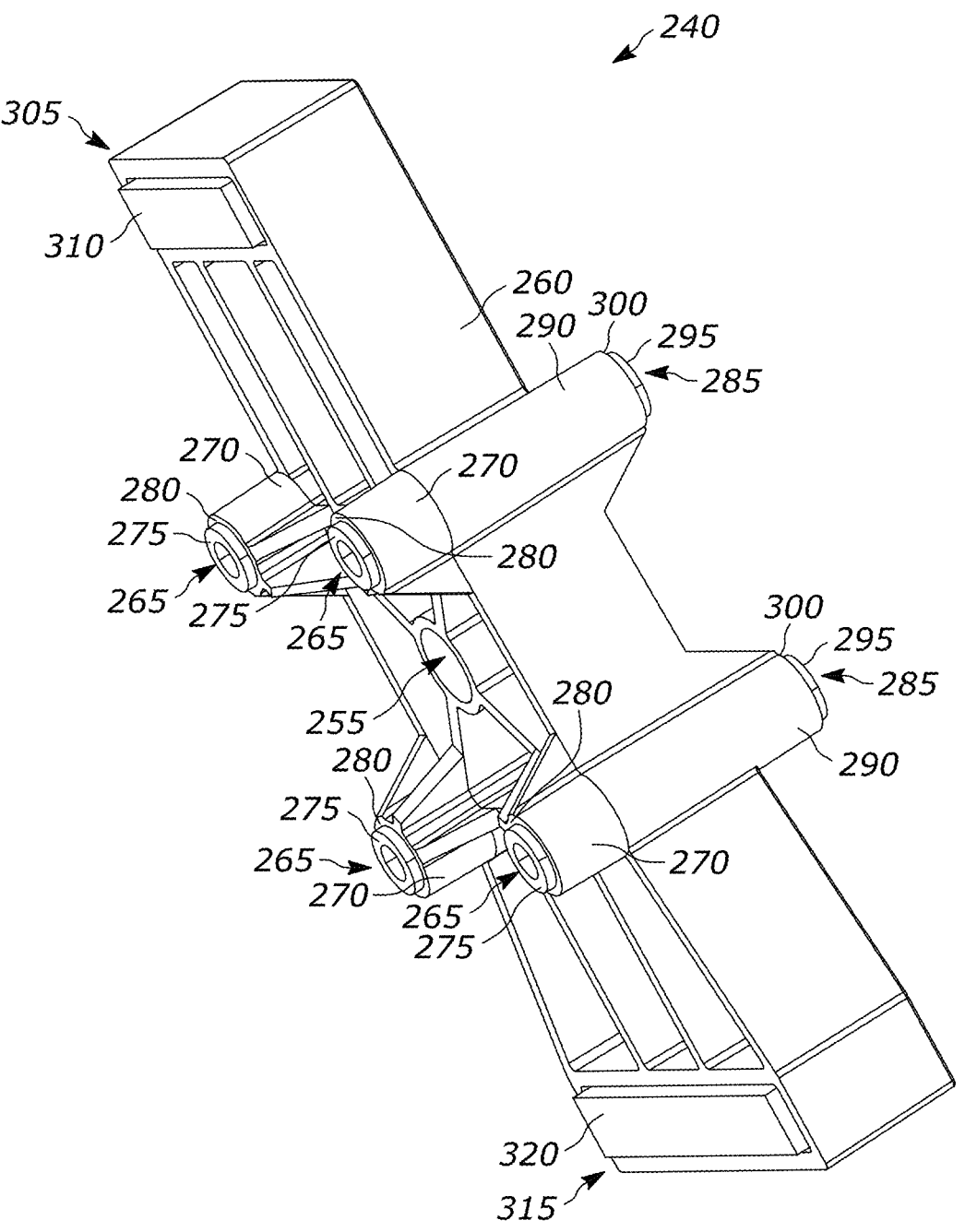
FIG. 8 illustrates a front perspective view of an example spacer of the RFID antenna assembly of FIG. 4.
Figure 9:
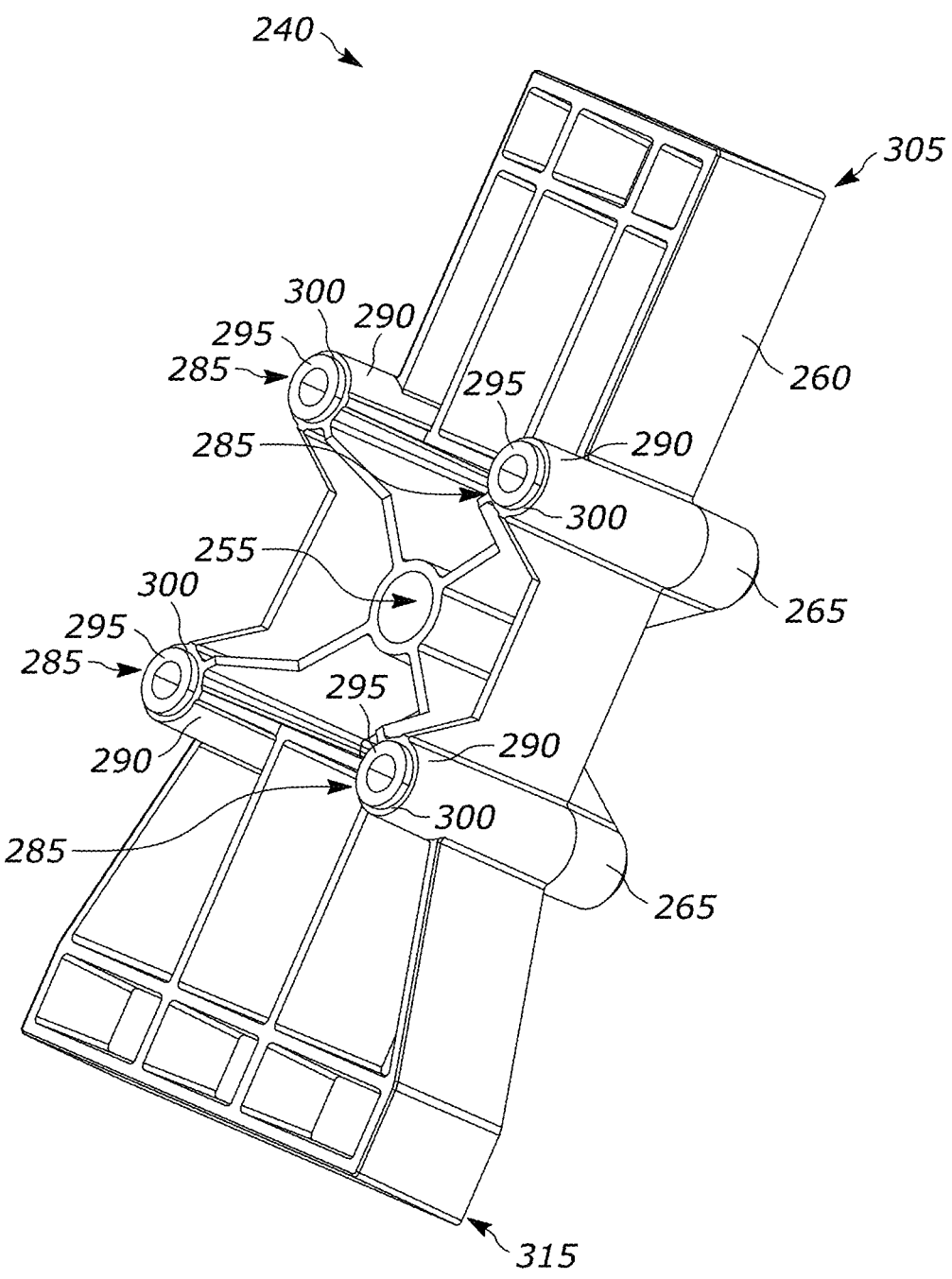
FIG. 9 illustrates a rear perspective view of the spacer of FIG. 8.
Figure 10:
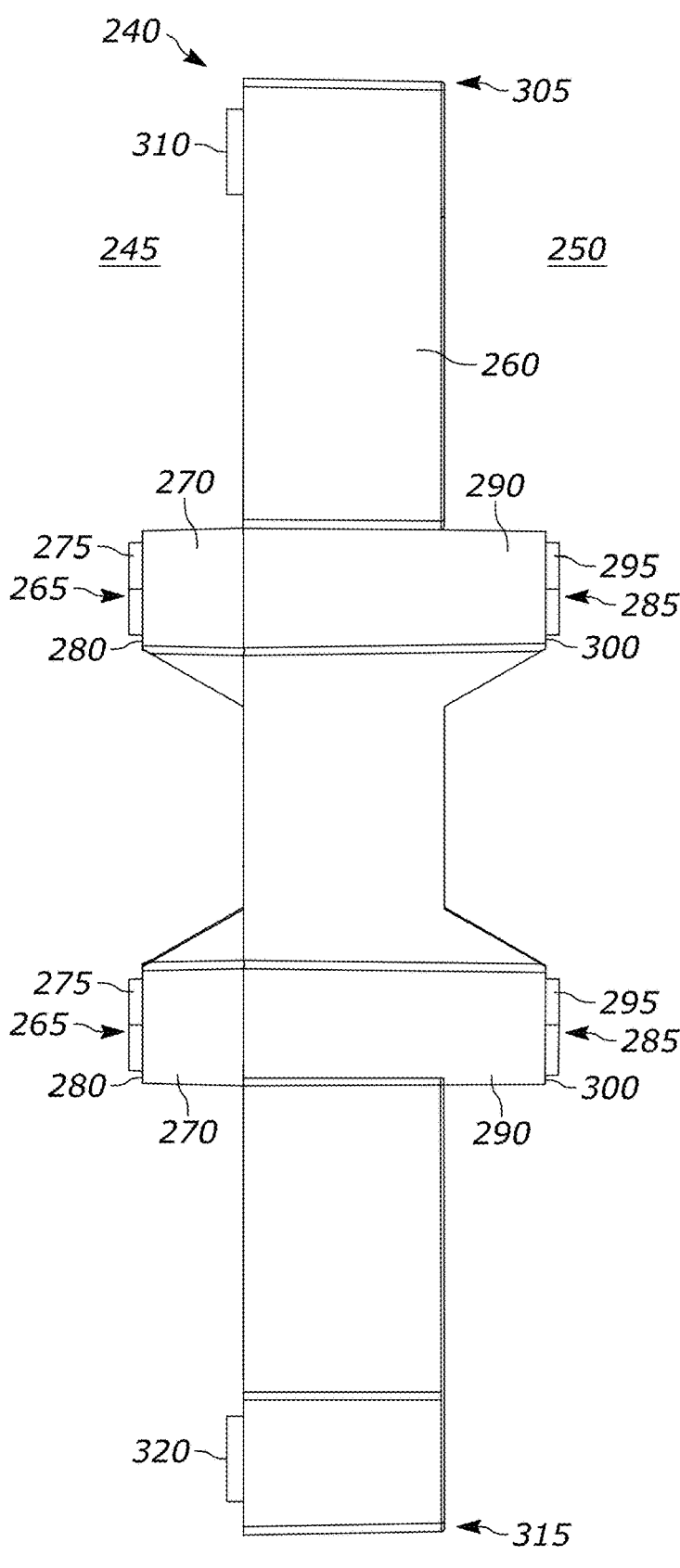
FIG. 10 illustrates a side view of the spacer of FIG. 8.

Referring to FIGS. 8-10, example spacer 240 generally includes a main body 260, a first plurality of posts 265 extending from main body 260 on first side 245 of spacer 240, and a second plurality of posts 285 extending from main body 260 on second side 250 of spacer 240. In the example shown, main body 260 of spacer 240 is webbed to minimize the amount of material between first PCB 205 and second PCB 220. The features of spacer 240 are electrically non-conductive so as to not interfere with the RF interaction between first PCB 205 and second PCB 220, which include at least first antenna trace 335 and at least second antenna trace 340, respectively, of RFID antenna assembly 200. In one embodiment, spacer 240 is made from injection molded polycarbonate. In other embodiments, spacer 240 can be made from other non-metallic materials. Minimizing the volume of material of spacer 240 between first PCB 205 and second PCB 220 can minimize any RF loss, such as dielectric loss, associated with RFID antenna assembly 200. In addition, creating air gaps between first PCB 205 and main body 260 of spacer 240 and between second PCB 220 and main body 260 of spacer 240, such as those characterized by distance D2 and distance D3, respectively, can further minimize any antenna RF loss, such as dielectric loss, and can thereby help to optimize the performance of RFID antenna assembly 200. Additionally, minimizing the amount of material of spacer 240 minimizes the weight of spacer 240 and thereby the weight of RFID antenna assembly 200 and in turn, the weight of hand-held device 100. In the example shown, the geometry of passage 255 is integrated with the webbing. The webbing consists of ribs connecting passage 255 to first plurality of posts 265 and second plurality of posts 285, which creates a relatively stiffer spacer 240 structure while minimizing RF loss and weight. In addition, when first PCB 205 and second PCB 220 are coupled to spacer 240, the resulting geometry forms a box structure with first PCB 205 and second PCB 220 capping off opposite faces. This geometry, together with the webbed details of main body 260 of spacer 240, create a rigid mechanical structure for RFID antenna assembly 200, which can thereby improve its ruggedness and durability. In addition, with first PCB 205 and second PCB 220 rigidly coupled to opposite faces of the same spacer 240, relative motion between first PCB 205 and second PCB 220 can be minimized during a drop event. This can mitigate the likelihood of cable 330, which is fixed at one end to first PCB 205, is fixed at its other end to main PCB 145, and can be constrained at other locations along its routed path in housing 105, from getting damaged, such as being severed, by an edge of opening 225 in second PCB 220. In other implementations, main body 260 can be solid, hollow, etc., but would still be electrically non-conductive.

Figure 6:
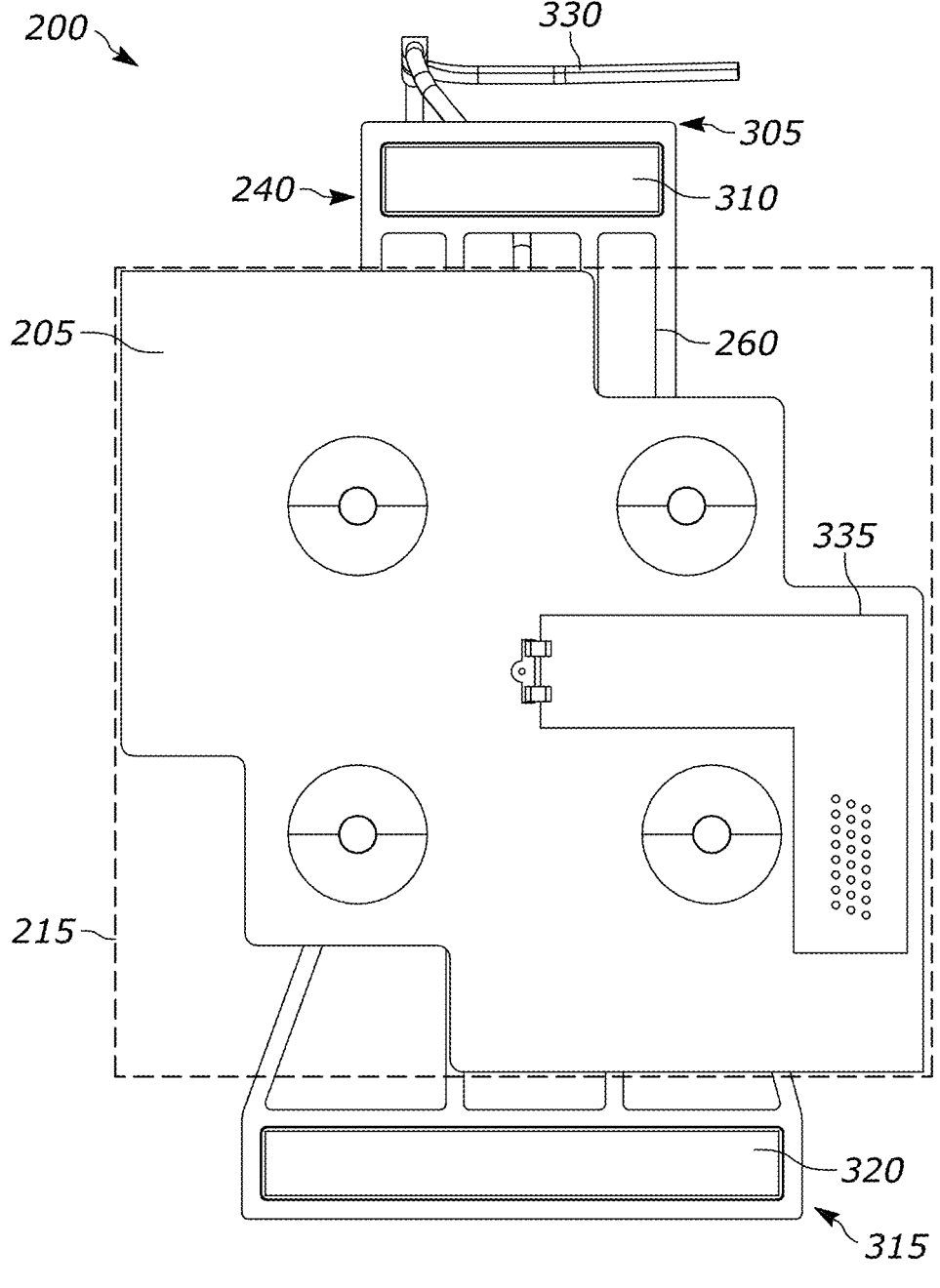
FIG. 6 illustrates a front view of the RFID antenna assembly of FIG. 4.
Figure 7:
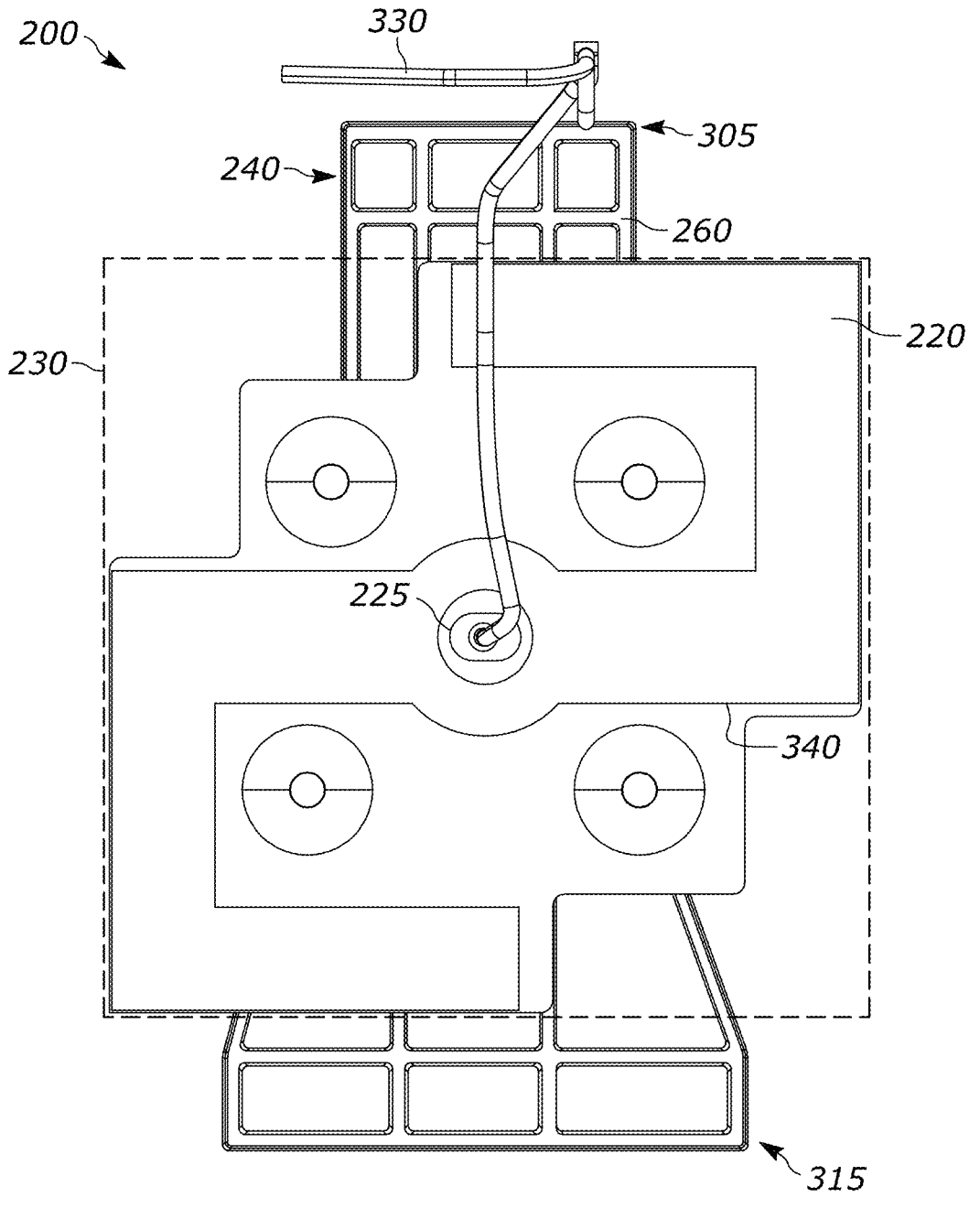
FIG. 7 illustrates a rear view of the RFID antenna assembly of FIG. 4.

As shown in FIGS. 6 and 7, first PCB 205 includes a non-conductive substrate (e.g., FR4 or other suitable material) with a printed copper trace forming first antenna trace 335 on first side 210 of first PCB 205 and second PCB 220 includes a non-conductive substrate (e.g., FR4 or other suitable material) with a printed copper trace forming second antenna trace 340 on first side 345 of second PCB 220. In some implementations, first PCB 205 and/or second PCB 220 can include one or more additional antenna traces. The size and shape of first antenna trace 335 and second antenna trace 340 in the example shown are exemplary and could be any size or shape appropriate for a given implementation. In addition, first antenna trace 335 can be located on either side of first PCB 205 and second antenna trace 340 can be located on either side of second PCB 220. In some implementations, at least one antenna trace can be located on both sides of a PCB. For example, in the example shown, first antenna trace 335 has a first portion located on first side 210 of first PCB 205 (FIG. 6), extends through the substrate of first PCB 205 via a series of plated thru-holes 350, and has a second portion on the opposite side of first PCB 205 (FIG. 4).

Referring again to FIGS. 4-7, to space first PCB 205 from main body 260 of spacer 240, in the example shown, each of the posts of first plurality of posts 265 has a first portion 270 that extends from main body 260 by a length equal to the spacing between first PCB 205 and main body 260 and a second portion 275 that extends from first portion 270 and has a smaller diameter than first portion 270, forming a shoulder 280. Similarly, to space second PCB 220 from main body 260 of spacer 240, each of the posts of second plurality of posts 285 has a first portion 290 that extends from main body 260 by a length equal to the spacing between second PCB 220 and main body 260 and a second portion 295 that extends from first portion 290 and has a smaller diameter than first portion 290, forming a shoulder 300. Second portion 275 of first plurality of posts 265 are configured to pass through holes in first PCB 205 such that first PCB 205 rests on shoulder 280, and second portion 295 of second plurality of posts 285 are configured to pass through holes in second PCB 220 such that second PCB 220 rests on shoulder 300. The holes in first PCB 205 that receive second portion 275 and the holes in second PCB 220 that receive second portion 295 are located sufficiently outside of the perimeters of first antenna trace 335 and second antenna trace 340 (i.e., the mounting holes and antenna traces do not overlap) such that both shoulder 280 and shoulder 300 are positioned outside the footprints of first antenna trace 335 and second antenna trace 340. As a result, neither shoulder 280 nor shoulder 300 touches first antenna trace 335 or second antenna trace 340. This arrangement helps keep spacer 240 physically separated from first antenna trace 335 and second antenna trace 340. In implementations where heat staking is used to couple first PCB 205 and second PCB 220 to spacer 240, second portion 275 of first plurality of posts 265 and second portion 295 of second plurality of posts 285 will be long enough to pass through first PCB 205 and second PCB 220, respectively, and have sufficient material on the opposite sides of first PCB 205 and second PCB 220 to use second portion 275 and second portion 295 to heat stake first PCB 205 and second PCB 220 to spacer 240. As such, second portion 275 of first plurality of posts 265 and second portion 295 of second plurality of posts 285 may be longer than what is illustrated in FIGS. 8-10 prior to the heat staking operation. Therefore, the only portions of spacer 240 that touch any portion of first PCB 205 and second PCB 220 are shoulder 280 and shoulder 300 of first plurality of posts 265 and second plurality of posts 285, respectively. In implementations where heat staking is used to couple first PCB 205 and second PCB 220 to spacer 240, the heat stake heads formed from second portion 275 and second portion 295 also touch first PCB 205 and second PCB 220, respectively. However, shoulder 280 and shoulder 300 and the heat stake heads formed from second portion 275 and second portion 295 are positioned outside the footprints of first antenna trace 335 and second antenna trace 340. This ensures an air gap is provided across the entire face of both first antenna trace 335 and second antenna trace 340. As a result, spacer 240, which is electrically non-conductive, positions and orients first antenna trace 335 and second antenna trace 340 relative to each other, without spacer 240 directly contacting first antenna trace 335 and second antenna trace 340, by holding first PCB 205 and second PCB 220 together. Spacer 240 therefore does not directly contact the RF structure of RFID antenna assembly 200. This helps to isolate the RF structure of RFID antenna assembly 200 and thereby minimizes RF loss and optimizes performance. With this construction, a majority of the material of spacer 240 is spaced apart from first PCB 205 and second PCB 220.

As shown in FIGS. 6 and 7, a first end 305 of spacer 240 extends outside of a first perimeter 215 of first PCB 205 (FIG. 6) and outside of a second perimeter 230 of second PCB 220 (FIG. 7), such that first end 305 can be held between a front half 120 of front portion 115 of housing 105 and a rear half 130 of front portion 115 of housing 105 (see FIG. 3). The illustrated outlines of first PCB 205 and second PCB 220 are exemplary. In other embodiments, the outlines of first PCB 205 and second PCB 220 may take other shapes but will not extend beyond first perimeter 215 and second perimeter 230, respectively. In addition, the outlines of first PCB 205 and second PCB 220 may match each other as illustrated or may not match each other. Similarly, a second end 315 of spacer 240, opposite first end 305, extends outside of first perimeter 215 of first PCB 205 (FIG. 6) and outside of second perimeter 230 of second PCB 220 (FIG. 7), such that second end 315 can be held between front half 120 of front portion 115 of housing 105 and rear half 130 of front portion 115 of housing 105 (FIG. 3). As shown in FIG. 3, with RFID antenna assembly 200 assembled in housing 105 of hand-held device 100, first PCB 205 can be spaced apart from front half 120 of front portion 115 of housing 105 by a distance D4 that is greater than or equal to 4.5 mm and less than or equal to 6.0 mm, and second PCB 220 can be spaced apart from rear half 130 of front portion 115 of housing 105 by a distance D5 that is greater than or equal to 3.5 mm and less than or equal to 4.5 mm. In other implementations, distance D4 and distance D5 could be smaller or larger depending on the particular implementation. Adequate spacing between first PCB 205 and second PCB 220 and housing 105, such as the spacings represented by distances D4 and D5, can minimize any system RF loss, such as dielectric loss through housing 105, as RF energy transmitted from and/or received by RFID antenna assembly 200 can be attenuated by housing 105. Minimizing such loss can thereby help to optimize the performance of RFID antenna assembly 200.

In the example shown, a first pad 310 (e.g., a rubber pad) is located at first end 305 of spacer 240 and positioned between first end 305 of spacer 240 and front half 120 of front portion 115 of housing 105 and a second pad 320 (e.g., a rubber pad) is located at second end 315 of spacer 240 and positioned between second end 315 of spacer 240 and front half 120 of front portion 115 of housing 105 to provide shock absorption between RFID antenna assembly 200 and front portion 115 of housing 105. First pad 310 and/or second pad 320 can also function to mitigate any tolerance stackup of the assembly in hand-held device 100. As compressible components, first pad 310 and second pad 320 can compensate for the buildup of dimensional and assembly tolerances in the system. In other implementations, in addition to or instead of first pad 310 and second pad 320, pads could be located at first end 305 and second end 315 between spacer 240 and rear half 130 of front portion 115. In yet other implementations, first end 305 and second end 315 of spacer 240 can be held between front half 120 and rear half 130 without any pads. First pad 310 and/or second pad 320 may be separate components assembled into spacer 240 and held in place with a press fit or adhesive, or in some implementations, first pad 310 and/or second pad 320 may be over-molded onto spacer 240 to become integral with spacer 240.

As previously stated, as can be seen in the example in FIG. 3, RFID antenna assembly 200 is nested between front half 120 and rear half 130 of front portion 115 of housing 105. More specifically, first end 305 of spacer 240 and second end 315 of spacer 240 are nested as such in housing 105. By nesting first end 305 of spacer 240 and second end 315 of spacer 240 of RFID antenna assembly 200, and not first PCB 205 and/or second PCB 220, in housing 105, the ruggedness and durability of RFID antenna assembly 200 can be increased, as the material and geometry of first PCB 205 and second PCB 220 can inherently be more fragile than that of spacer 240. As such, the structural preference is to mechanically isolate first PCB 205 and second PCB 220 for improved robustness and durability of RFID antenna assembly 200 rather than be structural elements in direct contact with housing 105. This arrangement can prevent the load path from going through first PCB 205 and second PCB 220 and/or through the attachment features that mate first PCB 205 and second PCB 220 to spacer 240 if hand-held device 100 is dropped. In addition, by not fixing or fastening RFID antenna assembly 200 to front half 120 and/or rear half 130 of front portion 115 of housing 105 and instead allowing RFID antenna assembly 200 to float in hand-held device 100, especially with the assembly of first pad 310 and/or second pad 320, RFID antenna assembly 200 can better withstand applied forces or shocks and can be less prone to physically cracking or breaking. In other implementations, RFID antenna assembly 200 could be fixed or fastened to front half 120 and/or rear half 130, for example, with non-metallic threaded fasteners, adhesive, etc.

Referring to FIG. 11, a flowchart showing an example method 500 of assembling an RFID antenna assembly (e.g., RFID antenna assembly 200) is illustrated. The order of execution of the steps may be changed, and/or some of the steps described may be changed, eliminated, combined, and/or subdivided into multiple steps.

At step 505, a cable (e.g., cable 330) is coupled to a first PCB (e.g., first PCB 205). The cable can be an RF coaxial cable that is mechanically and electrically coupled to the first PCB, for example, via soldering.

At step 510, the cable is passed through a passage (e.g., passage 255) in a spacer (e.g., spacer 240). The spacer can be electrically non-conductive and can include a main body (e.g., main body 260), a first plurality of posts (e.g., first plurality of posts 265) extending from the main body on a first side (e.g., first side 245) of the spacer, and a second plurality of posts (e.g., second plurality of posts 285) extending from the main body on a second side (e.g., second side 250) of the spacer.

At step 515, the first PCB is positioned proximate the first side of the spacer and is secured to the spacer (e.g., by heat staking the first PCB to the first plurality of posts) such that a radiation pattern (e.g., radiation pattern 400) produced by the RFID antenna assembly is substantially directed away from a first side (e.g., first side 210) of the first PCB, opposite the spacer. The first PCB can be positioned on the first plurality of posts such that the first PCB is spaced apart from the main body of the spacer, a first end (e.g., first end 305) of the spacer extends outside of a first perimeter (e.g., first perimeter 215) of the first PCB and outside of a second perimeter (e.g., second perimeter 230) of the second PCB, and a second end (e.g., second end 315) of the spacer, opposite the first end, extends outside of the first perimeter of the first PCB and outside of the second perimeter of the second PCB. The spacer can also have a first pad (e.g., first pad 310) located at the first end on the first side of the spacer and a second pad (e.g., second pad 320) located at the second end on the first side of the spacer.

At step 520, the cable is passed through an opening (e.g., opening 225) formed in a second PCB (e.g., second PCB 220) such that the first PCB and the second PCB are configured to operate as an RFID antenna.

At step 525, the second PCB is positioned proximate the second side of the spacer, opposite the first side, and is secured to the spacer (e.g., by heat staking the second PCB to the second plurality of posts). The second PCB can be mounted on the second plurality of posts such that the second PCB is spaced apart from the main body of the spacer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissible in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radio-frequency identification (RFID) antenna assembly, comprising:

a first printed circuit board (PCB) and a second PCB, spaced apart from and generally parallel to the first PCB, the first PCB and the second PCB configured to operate as an RFID antenna;

a spacer; and a cable coupled to the first PCB and extending through a passage in the spacer and an opening in the second PCB;

wherein the first PCB is positioned proximate a first side of the spacer and is secured to the spacer;

wherein the second PCB is positioned proximate a second side of the spacer, opposite the first side, and is secured to the spacer; and wherein a radiation pattern produced by the RFID antenna assembly is substantially directed away from a first side of the first PCB, opposite the spacer.

2. The RFID antenna assembly of claim 1, wherein the spacer is electrically non-conductive.

3. The RFID antenna assembly of claim 1, wherein the cable is a radio-frequency (RF) coaxial cable that is mechanically and electrically coupled to the first PCB.

4. The RFID antenna assembly of claim 1, wherein:

the spacer includes a main body, a first plurality of posts extending from the main body on the first side of the spacer, and a second plurality of posts extending from the main body on the second side of the spacer;

the first PCB is mounted on the first plurality of posts such that the first PCB is spaced apart from the main body of the spacer; and the second PCB is mounted on the second plurality of posts such that the second PCB is spaced apart from the main body of the spacer.

5. The RFID antenna assembly of claim 4, wherein the first plurality of posts are positioned outside of a footprint of a first antenna trace on the first PCB and the second plurality of posts are positioned outside of a footprint of a second antenna trace on the second PCB.

6. The RFID antenna assembly of claim 4, wherein the first PCB is secured to the first plurality of posts via heat staking and the second PCB is secured to the second plurality of posts via heat staking.

7. The RFID antenna assembly of claim 1, wherein:

a first end of the spacer extends outside of a first perimeter of the first PCB and outside of a second perimeter of the second PCB; and a second end of the spacer, opposite the first end, extends outside of the first perimeter of the first PCB and outside of the second perimeter of the second PCB.

8. The RFID antenna assembly of claim 7, comprising a first pad at the first end of the spacer and a second pad at the second end of the spacer.

9. The RFID antenna assembly of claim 1, wherein a main body of the spacer is webbed.

10. A hand-held device for reading radio-frequency identification (RFID) tags, comprising:

a housing including a top portion, a front portion, and a handle;

a main printed circuit board (PCB) positioned in the top portion of the housing; and an RFID antenna assembly positioned in the front portion of the housing and operatively connected to the main PCB;

wherein the RFID antenna assembly comprises:

a first PCB and a second PCB, spaced apart from and generally parallel to the first PCB, the first PCB and the second PCB configured to operate as an RFID antenna;

a spacer; and a cable coupled to the first PCB and extending through a passage in the spacer and an opening in the second PCB, the cable operatively connecting the first PCB and the main PCB;

wherein the first PCB is positioned proximate a first side of the spacer and is secured to the spacer;

wherein the second PCB is positioned proximate a second side of the spacer, opposite the first side, and is secured to the spacer; and wherein a radiation pattern produced by the RFID antenna assembly is substantially directed away from a first side of the first PCB, opposite the spacer.

11. The hand-held device of claim 10, wherein the spacer is electrically non-conductive.

12. The hand-held device of claim 10, wherein the cable is a radio-frequency (RF) coaxial cable that is mechanically and electrically coupled to the first PCB.

13. The hand-held device of claim 10, wherein:

the spacer of the RFID antenna assembly includes a main body, a first plurality of posts extending from the main body on the first side of the spacer, and a second plurality of posts extending from the main body on the second side of the spacer;

the first PCB is mounted on the first plurality of posts such that the first PCB is spaced apart from the main body of the spacer; and the second PCB is mounted on the second plurality of posts such that the second PCB is spaced apart from the main body of the spacer.

14. The hand-held device of claim 13, wherein the first plurality of posts are positioned outside of a footprint of a first antenna trace on the first PCB and the second plurality of posts are positioned outside of a footprint of a second antenna trace on the second PCB.

15. The hand-held device of claim 13, wherein the first PCB is secured to the first plurality of posts via heat staking and the second PCB is secured to the second plurality of posts via heat staking.

16. The hand-held device of claim 10, wherein:

a first end of the spacer extends outside of a first perimeter of the first PCB and outside of a second perimeter of the second PCB and is held between a front half of the front portion of the housing and a rear half of the front portion of the housing; and a second end of the spacer, opposite the first end, extends outside of the first perimeter of the first PCB and outside of the second perimeter of the second PCB and is held between the front half of the front portion of the housing and the rear half of the front portion of the housing.

17. The hand-held device of claim 16, comprising: a first pad located at the first end of the spacer and positioned between the first end of the spacer and the front half of the front portion of the housing; and a second pad located at the second end of the spacer and positioned between the second end of the spacer and the front half of the front portion of the housing.

18. A method of assembling a radio-frequency identification (RFID) antenna assembly, comprising:

coupling a cable to a first printed circuit board (PCB);

passing the cable through a passage in a spacer;

positioning the first PCB proximate a first side of the spacer and securing the first PCB to the spacer such that a radiation pattern produced by the RFID antenna assembly is substantially directed away from a first side of the first PCB, opposite the spacer;

passing the cable through an opening formed in a second PCB, the first PCB and the second PCB configured to operate as an RFID antenna; and

15 positioning the second PCB proximate a second side of the spacer, opposite the first side, and securing the second PCB to the spacer.

19. The method of claim 18, wherein the spacer is electrically non-conductive.

20. The method of claim 18, wherein the cable is a radio-frequency (RF) coaxial cable and coupling the cable to the first PCB comprises mechanically and electrically coupling the cable to the first PCB.

21. The method of claim 18, wherein:

the spacer includes a main body, a first plurality of posts extending from the main body on the first side of the spacer, and a second plurality of posts extending from the main body on the second side of the spacer;

positioning the first PCB proximate the first side of the spacer comprises mounting the first PCB on the first plurality of posts such that the first PCB is spaced apart from the main body of the spacer; and positioning the second PCB proximate the second side of the spacer comprises mounting the second PCB on the second plurality of posts such that the second PCB is spaced apart from the main body of the spacer.

22. The method of claim 21, wherein the first plurality of posts are positioned outside of a footprint of a first antenna trace on the first PCB and the second plurality of posts are positioned outside of a footprint of a second antenna trace on the second PCB.

23. The method of claim 21, wherein securing the first PCB to the spacer comprises heat staking the first PCB to the first plurality of posts and securing the second PCB to the spacer comprises heat staking the second PCB to the second plurality of posts.

24. The method of claim 18, wherein:

a first end of the spacer extends outside of a first perimeter of the first PCB and outside of a second perimeter of the second PCB and comprises a first pad; and a second end of the spacer, opposite the first end, extends outside of the first perimeter of the first PCB and outside of the second perimeter of the second PCB and comprises a second pad.

* * * * *